United States Patent
Ham

(10) Patent No.: US 9,340,093 B2
(45) Date of Patent: May 17, 2016

(54) METHOD AND APPARATUS FOR DYNAMICALLY CONTROLLING HVAC (HEATING, VENTILATING, AND AIR-CONDITIONING) FOR VEHICLE BASED ON DISCOMFORT INDEX

(71) Applicant: TINNOS INC., Seoul (KR)

(72) Inventor: Seong Sik Ham, Seoul (KR)

(73) Assignee: TINNOS INC., Seoul (KR)

(*) Notice: Subject to any disclaimer, the term of this patent is extended or adjusted under 35 U.S.C. 154(b) by 0 days.

(21) Appl. No.: 14/707,538

(22) Filed: May 8, 2015

(65) Prior Publication Data
US 2016/0089955 A1 Mar. 31, 2016

(30) Foreign Application Priority Data

Sep. 30, 2014 (KR) .......................... 10-2014-0130716
Apr. 13, 2015 (JP) ................................. 2015-081451

(51) Int. Cl.
*F24F 11/00* (2006.01)
*B60H 1/00* (2006.01)

(52) U.S. Cl.
CPC ........ *B60H 1/00742* (2013.01); *B60H 1/00757* (2013.01); *B60H 1/00764* (2013.01); *B60H 1/00821* (2013.01); *B60H 1/00878* (2013.01); *B60H 1/00892* (2013.01)

(58) Field of Classification Search
CPC ........... B60H 1/00742; B60H 1/00757; B60H 1/00821; B60H 1/00878; B60H 1/00764; B60H 1/00892

USPC .............................................. 236/44 R, 44 C
See application file for complete search history.

(56) References Cited

FOREIGN PATENT DOCUMENTS

| JP | 2002358101 A | 12/2002 |
|---|---|---|
| JP | 2007269268 A | 10/2007 |
| JP | 2008074363 A | 4/2008 |
| JP | 2011230529 A | 11/2011 |
| JP | 2012158226 A | 8/2012 |
| JP | 2014129067 A | 7/2014 |
| KR | 1019970069434 A | 11/1997 |
| KR | 1020060018600 A | 3/2006 |
| KR | 1020070082933 A | 8/2007 |
| KR | 1020140028254 A | 3/2014 |

*Primary Examiner* — Ljiljana Ciric
(74) *Attorney, Agent, or Firm* — Hauptman Ham, LLP

(57) ABSTRACT

An apparatus for controlling an HVAC device for a vehicle includes a sensor unit mounted on the vehicle and configured to sense a bodily response of the user, an HVAC device control unit configured to control temperature and humidity inside the vehicle, and a control unit configured to control the HVAC device control unit based on the bodily response sensed by the sensor unit and to control temperature, direction, air volume, and speed of wind supplied inside the vehicle. The bodily response includes any one selected from the group consisting of body temperature, respiration volume, carbon dioxide amount in breath, voice, used words, facial expression of the user, and combinations thereof. The control unit is configured to calculate the discomfort index of the user based on the bodily response and to dynamically control the HVAC device control unit based on the discomfort index.

10 Claims, 2 Drawing Sheets

METHOD AND APPARATUS FOR DYNAMICALLY CONTROLLING HVAC (HEATING, VENTILATING, AND AIR-CONDITIONING) FOR VEHICLE BASED ON DISCOMFORT INDEX

CROSS-REFERENCE TO RELATED APPLICATIONS

This application claims the benefit of Korean Patent Application No. 10-2014-0130716 filed with the Korean Intellectual Property Office on Sep. 30, 2014 and Japanese Patent Application No. 2015-081451 filed with the Japanese Patent Office on Apr. 13, 2015, the full disclosure of which is incorporated herein by reference.

BACKGROUND

1. Field

The present disclosure relates to a method and an apparatus for dynamically controlling HVAC (Heating, Ventilating, and Air-Conditioning) for a vehicle based on discomfort index, and more particularly, a method and an apparatus for calculating discomfort index based on a user's body reaction measured by a sensor and dynamically controlling the HVAC for the vehicle based on the measured discomfort index.

2. Description of the Related Art

An HVAC system is a device for controlling the interior air temperature of an automotive vehicle in a way in which cold air is obtained making use of a heat exchanged air by using a power generating apparatus of the vehicle to compress refrigerant, condensing the refrigerant by external air, rapidly expanding and evaporating the condensed refrigerant to reduce temperature by absorbing external heat when the refrigerant is evaporated, and generating the heat exchanged air by air flow on the surface of an evaporator, and in which warm air is obtained by air flow on the surface of a heater which uses cooling water warmed by heat obtained by the combustion of fuel in the power generating device.

Such HVAC system provides a comfortable indoor environment by performing cooling, heating and ventilation of indoor air by convection to outside air or indoor air. Recently, a HVAC system having automatic temperature control (FATC: Full Auto Temperature Control) function has been utilized. The HVAC system having the automatic temperature control function can always maintain indoor temperature at a temperature set by a user regardless of external temperature change by adjusting air-conditioning in the system.

Korean Published Patent Publication No. 1997-0069434 discloses the contents to automatically control the indoor temperature of a vehicle by sensing the temperature of driver's hands gripping a steering wheel as an automatic temperature adjustment measures.

Korean Published Patent Publication No. 2006-0018600 discloses a HVAC system of vehicle and an operating method thereof. The system receives information such as indoor temperature, wind speed, wind direction, air outlet mode, inside/outside equipment selection, operating possibility of air conditioner, etc., stores the received information as a comfortable data, and automatically operates an aft conditioning and ventilation equipment based on the stored comfortable data when selecting a comfortable button.

SUMMARY

An apparatus for controlling an HVAC device for a vehicle based on a discomfort index of a user of the vehicle, according to some embodiments of the present disclosure, includes a sensor unit mounted on the vehicle and configured to sense a bodily response of the user, an HVAC device control unit configured to control temperature and humidity inside the vehicle, and a control unit configured to control the HVAC device control unit based on the bodily response sensed by the sensor unit and to control temperature, direction, air volume, and speed of wind supplied inside the vehicle. The bodily response includes any one selected from the group consisting of body temperature, respiration volume, carbon dioxide amount in breath, voice, used words, facial expression of the user, and combinations thereof. The control unit is configured to calculate the discomfort index of the user based on the bodily response and to dynamically control the HVAC device control unit based on a calculated discomfort index.

A method of controlling an HVAC device for a vehicle based on a discomfort index of a user of the vehicle, according to some embodiments of the present disclosure, includes sensing a bodily response of the user by using a sensor unit mounted on the vehicle, and controlling temperature and humidity inside the vehicle based on the bodily response, and controlling temperature, direction, air volume, and speed of wind supplied inside the vehicle. The bodily response includes any one selected from the group consisting of body temperature, respiration volume, carbon dioxide amount in breath, voice, used words, facial expression of the user, and combinations thereof. The controlling temperature and humidity includes calculating the discomfort index of the user based on the bodily response and controlling dynamically the temperature and the humidity based on a calculated discomfort index.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
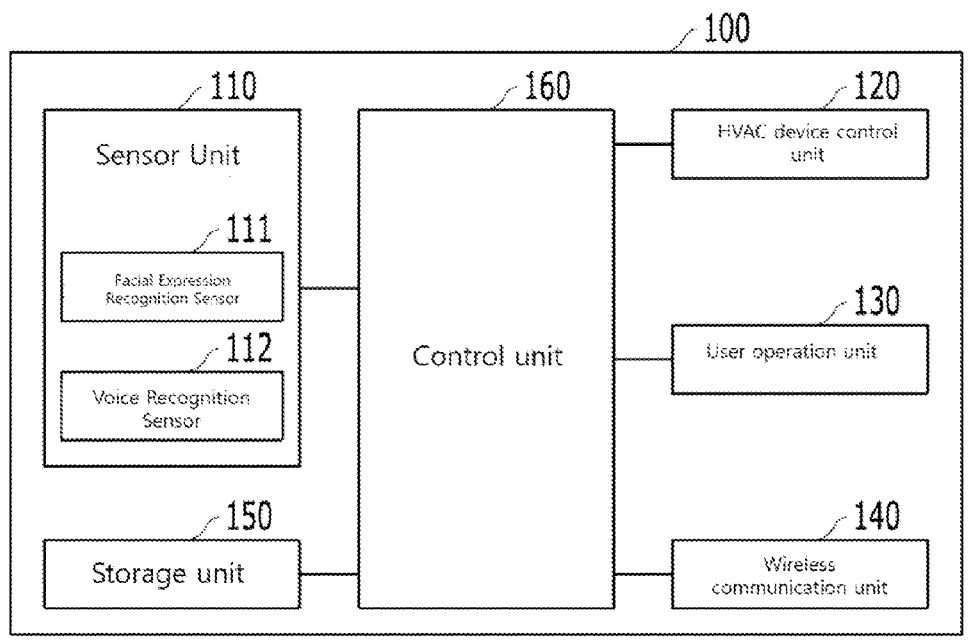
FIG. 1 is a block diagram showing a configuration of a vehicle HVAC control device using discomfort index according to some embodiments of the present disclosure.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

FIG. 1 is a block diagram showing a configuration of a vehicle HVAC control device 100 using discomfort index according to some embodiments of the present disclosure.

According to some embodiments of the present disclosure, the vehicle HVAC control device 100 comprises a sensor unit 110, a HVAC device control unit 120, a user operation unit 130, a wireless communication unit 140, a storage unit 150 and a control unit 160.

The sensor unit 110 senses a bodily response of a user who rides in a vehicle, which varies with time and various situations. That is, the sensor unit 110 senses at least one or more of the body temperature, respiration volume, carbon dioxide amount in the breath, voice information (intonation, tone, used words, etc.) and facial expression of the user.

To this end, the sensor unit 110 includes at least a facial expression recognition sensor 110 for recognizing the facial expression of the user who rides in a vehicle and a voice recognition sensor 120 for recognizing the user's voice.

The HVAC device control unit 120 controls the HVAC device of vehicle to adjust the internal temperature and humidity of the vehicle.

The user operation unit 130 receives an input from the user to control the vehicle HVAC device, generates a signal according to the input and supplies the generated signal to the control unit 160. The user operation unit 130 may comprise Key Pad including numeric keys and direction keys, etc., Dome Switch, Touch Pad, Jog Wheel, Jog Switch and the like. In addition, the operation unit 130 can also generate an input signal by the signal of an external input device (not shown) such as a mouse that is connected either with or without wire.

The wireless communication unit 140 communicates with the vehicle users mobile terminal (for example, notebook PC, smartphone, tablet PC, etc.) and receives discomfort index information of the user and HVAC control mode corresponding thereto.

The user stores discomfort index information of the user himself and HVAC control mode corresponding thereto in a mobile terminal, and transmits information about the discomfort index information of the user himself and the HVAC control mode corresponding thereto stored in the mobile terminal to the vehicle HVAC control device 100 via the wireless communication unit 140 if the discomfort index information of the user himself and the HVAC control mode corresponding thereto have not been stored in the storage unit 150 of the vehicle when riding in the vehicle.

Then, the vehicle HVAC control device 100 stores information received from the user's mobile terminal in the storage unit 150. The storage unit 150 includes, for example, ROM and RAM.

The storage unit 150 associates a plurality of discomfort index information of the user himself with a plurality of HVAC control modes corresponding thereto and stores the associated result as a table.

Here, each of the HVAC control modes is set with the temperature, direction, volume, speed, etc. of wind blown to vehicle interior from a vehicle HVAC device to adjust corresponding discomfort index to a predetermined level.

Further, the storage unit 150 is stored with information for calculating discomfort index based on each user's bodily response.

The storage unit 150 stores programs and data required for operation of the vehicle HVAC device and includes program area and data area. The program area is stored with program for controlling the operation of the vehicle HVAC device and application program required for other optional functions of the vehicle HVAC control device 100, for example, air flow direction control of wind, temperature control of wind, etc. The data area is stored with a temperature that is preferred by the user and information about the temperature, direction, volume, speed, etc. of wind at each humidity level.

The control unit 160 totalizes the user's bodily responses sensed by the sensor unit 110 to refer to the user information that has been stored in the storage unit 150, and calculates discomfort index of the user.

The control unit 160 determines the degree of mood from the user's facial expression. For example, if it is determined to be a bad expression of mood, the control unit 160 determines that the discomfort index is high. Further, the control unit 160 analyzes the user's voice and determines the user's discomfort index from intonation, tone, used words, etc. of the user's voice. And further, the control unit 160 measures the respiration volume and carbon dioxide amount of the user, and determines the user's discomfort index from the results of the measurement.

The control unit 160 obtains speed information of the vehicle from an electronic control unit of the vehicle, and calculates discomfort index by combining the variation pattern of speed indicated by the obtained speed information and the user's bodily responses. For example, when the variation amount of the vehicle's speed within a predetermined period of time is greater than a threshold value, the control unit 160 calculates the discomfort index as its value is larger in accordance with the variation amount of the speed by multiplying a coefficient according to the variation amount by discomfort index calculated based on the bodily response.

The control unit 160 may associate the user's bodily responses with the variation amount of the vehicle' speed to store the associated results in the storage unit 150, and calculate the discomfort index as its value is larger in accordance with the variation amount of speed by multiplying a coefficient according to the variation amount of speed by discomfort index calculated based on the bodily response even when the variation amount of speed increases more than a predetermined value for the variation amount of speed while the bodily responses do not indicate uncomfortable condition.

Further, the control unit 160 may calculate discomfort index by obtaining the operation amount of steering wheel from an electronic control unit of the vehicle and combining the operation amount of the steering wheel and the user's bodily responses. For example, when traveling on the highway in which the operation amount of the steering wheel is within a predetermined range, if there is continued a state where the operation amount of the steering wheel is larger than a threshold and it looks like the vehicle that is snaked, the control unit 160 calculates the discomfort index as its value is larger in accordance with the operation amount by multiplying a coefficient according to the operation amount by discomfort index calculated based on the bodily responses.

The control unit 160 may associate the user's bodily responses with the operation amount of the steering wheel to store the associated results in the storage unit 150, and calculate the discomfort index as its value is larger in accordance with the operation amount of the steering wheel by multiplying a coefficient according to the operation amount of the steering wheel by discomfort index calculated based on the bodily responses even when the operation amount of the steering wheel increases more than a predetermined value for the steering wheel operation amount while the bodily responses do not indicate uncomfortable condition.

Then, the control unit 160 selects a HVAC control mode corresponding to the calculated discomfort index. After that, the control unit 160 outputs the selected HVAC control mode to the HVAC device control unit 120 and controls the HVAC device of a vehicle.

Figure 2:
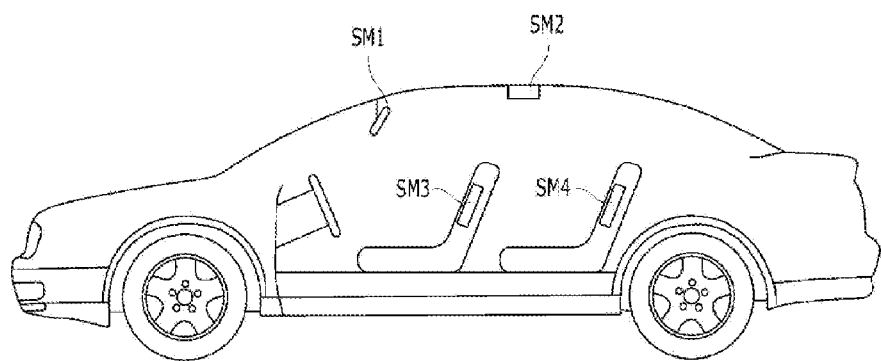
FIG. 2 is a schematic diagram showing a mounted position of a sensor unit in the embodiment of the present disclosure.

FIG. 2 is a schematic diagram showing a mounted position of a sensor unit 110 in the embodiment of the present disclosure.

As described above, the sensor unit 110 senses changes of user's facial expression, voice, respiration, etc.

According to some embodiments of the present disclosure, the vehicle HVAC control device 100 using discomfort index is able to perform an optimum HVAC control for each user who rides in a vehicle.

To this end, a sensor module of the sensor unit 110 is installed on the upper portion of a seat or in the interior of a vehicle in order to be able to separately sense body information of each user who rides in a vehicle.

For example, since a voice sensor module and a sensor module for sensing the user's body temperature are installed on a seat of a vehicle, the sensor unit 110 can sense the body temperature and voice information of a user who sits on the seat by using the sensor module installed on the seat.

If there is more than one seat in vehicle interior, a sensor module SM3 and SM4 is installed on each seat, thus being able to sense the body temperature and voice information of each user who sits on the seat.

Further, a sensor module SM1 and SM2 for sensing the user's facial expression and breathing is installed on a room mirror or the upper portion of the interior.

By using such a sensor module, it is possible to provide an optimal vehicle interior environment to a driver based on information of the body temperature, etc. of the driver who sits on the seat, and also provide an optimal vehicle interior environment to a user of passenger seat based on information of the body temperature, etc. of the user who sits on the passenger seat.

Figure 3:
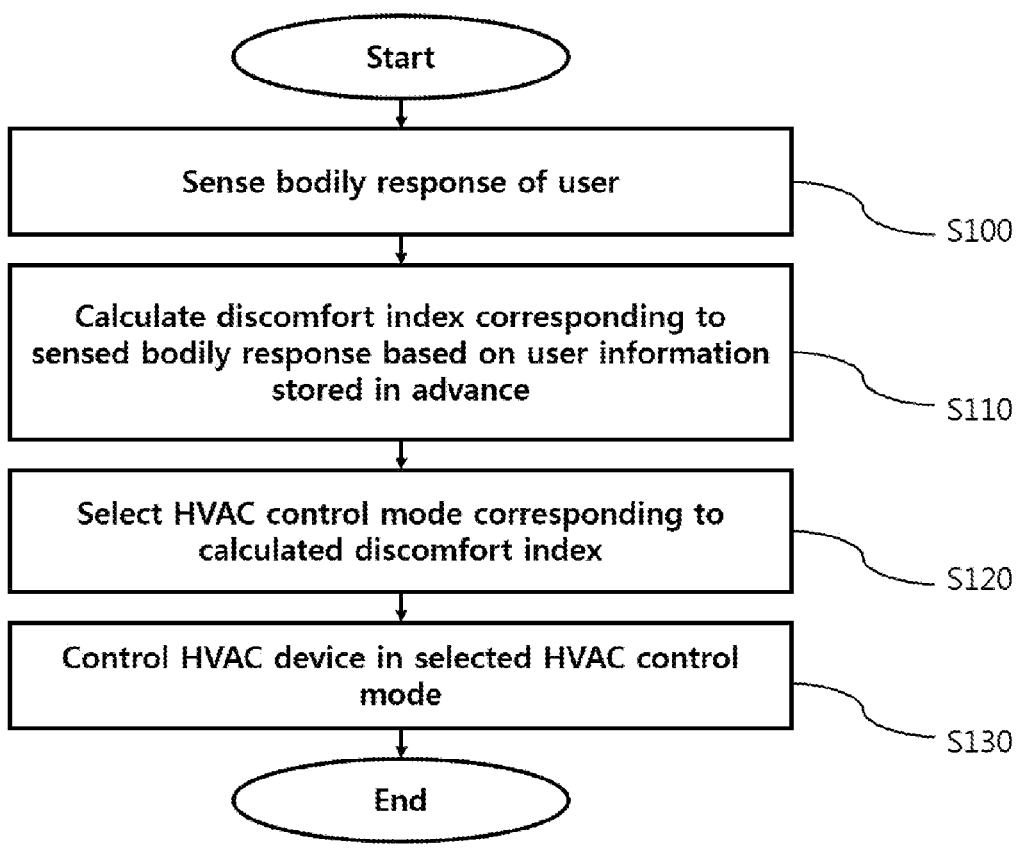
FIG. 3 is a flowchart for explaining the control of a vehicle HVAC using discomfort index according to some embodiments of the present disclosure.

FIG. 3 is a flowchart for explaining the control of a vehicle HVAC using discomfort index according to some embodiments of the present disclosure.

In step S100, the sensor unit 110 installed in a vehicle senses a bodily response of a user who rides in the vehicle.

Here, the sensor unit 110 senses the bodily response comprising at least one or more of the body temperature, respiration volume, carbon dioxide amount in the breath, voice, used words and facial expression of the user.

In step S110, the control unit 160 refers to user information and calculates the users discomfort index corresponding to the bodily reaction sensed by the sensor unit 110.

The discomfort index may be different by individuals even at the same temperature and humidity conditions.

Therefore, the vehicle HVAC control device 100 using discomfort index according to some embodiments of the present disclosure refers to personal information of user, and calculates the discomfort index of each user.

That is, according to some embodiments of the present disclosure, the vehicle HVAC control device calculates the user's discomfort index by not only simple user's bodily response, but also referring to the user information.

To this end, the user can store discomfort index that he feels for himself and every condition corresponding thereto in the storage unit 150. Further, if information for calculating the user own discomfort index has not been stored in the storage unit 150, the user can perform communication with the vehicle HVAC control device 100 via a mobile terminal to store the corresponding information in the storage unit 150.

In addition, the user can input information via the user operation unit 130 to update data that has been stored in storage unit 150 if necessary.

In step S120, the control unit 160 selects the HVAC control mode corresponding to the users discomfort index.

For example, the control unit 160 refers to information which has been stored in the storage unit 150, calculates the discomfort index corresponding to a sensed bodily response, and selects the HVAC control mode corresponding to the calculated discomfort index.

In addition, the user can input information via the user operation unit 130 to update HVAC control mode that has been stored in storage unit 150 if necessary.

In step S130, the HVAC device control unit 120 controls HVAC device of vehicle in the selected HVAC control mode.

The HVAC device control unit 120 controls the HVAC device of vehicle in the selected HVAC control mode to determine the temperature, direction, volume and speed of wind blown to the vehicle interior.

In this way, according to some embodiments of the present disclosure, the vehicle HVAC control device 100 comprises a sensor unit 110, installed in the vehicle, for sensing a bodily response of the vehicle's user, a HVAC device control unit 120 for controlling the temperature and humidity of the vehicle interior, and a control unit 160 for controlling the HVAC device control unit 120 based on the bodily response sensed by the sensor unit 110 and controlling the temperature, direction, volume and speed of wind blown to the vehicle interior.

The bodily response comprises at least one or more of the body temperature, respiration volume, carbon dioxide amount in the breath, voice, used words and facial expression of the user, and the control unit 160 calculates discomfort index of the user by totalizing the bodily response and dynamically controls the HVAC device control unit 120 based on the calculated discomfort index.

The vehicle HVAC control device 100 further comprises a storage unit 150 for storing as a control data the temperature, direction, volume and speed of wind to adjust the discomfort index to a predetermined level in association with the user's discomfort index, and when the calculated discomfort index is higher than the predetermined level, the control unit 160 determines the temperature, direction, volume and speed of wind blown to the vehicle interior to lower the calculated discomfort index to the predetermined level on the basis of the control data which has been stored in the storage unit.

In some embodiments of the present disclosure, the vehicle HVAC control device 100 further comprises a user operation unit 130 for receiving an input from the user, and when at least one of the temperature, direction, volume and speed of wind blown to the vehicle interior is changed via the user operation unit, the control unit updates the control date which has been stored in the storage unit to the changed information.

In some embodiments of the present disclosure, the sensor unit 110 includes a facial expression recognition sensor 111 for recognizing the user's facial expression, and a voice recognition sensor 112 for recognizing the user's voice.

In some embodiments of the present disclosure, the vehicle HVAC control device 100 further comprises a wireless communication unit 140 for receiving the user's discomfort index information via communication with the user's mobile terminal, and the control unit 160 updates the control date which has been stored in the storage unit 150 by using the user's discomfort index information received from the wireless communication unit 140.

In some embodiments of the present disclosure, the vehicle HVAC control device 100 further comprises a storage unit 150 for storing HVAC control mode in association with the user's discomfort index, and when the calculated discomfort index is higher than the predetermined level, the control unit 160 selects a HVAC control mode corresponding to the calculated discomfort index from the HVAC control modes which has been stored in the storage unit 150, and controls the HVAC device control unit 120 in the selected HVAC control mode.

In some embodiments of the present disclosure, the control unit 160 further obtains speed information of the vehicle from an electronic control unit of the vehicle, and calculates the discomfort index by combining the variation pattern of speed indicated by the obtained speed information and the bodily response.

In some embodiments of the present disclosure, the speed variation pattern includes a variation amount of the vehicle's speed, and when the variation amount of the vehicle's speed within a predetermined period of time is greater than a threshold value, the control unit 16 calculate the discomfort index as its value is larger in accordance with the variation amount of the speed by multiplying a coefficient according to the speed variation amount by the discomfort index calculated based on the bodily response.

In some embodiments of the present disclosure, the control unit 160 further obtains the operation amount of steering wheel from the electronic control unit of the vehicle, and calculates the discomfort index by combining the bodily response and the variation pattern of the obtained operation amount of the steering wheel.

In some embodiments of the present disclosure, when the operation amount of the steering wheel within a predetermined period of time is greater than a threshold value, the control unit 160 calculates the discomfort index as its value is larger in accordance with the operation amount of the steering wheel by multiplying a coefficient according to the operation amount of the steering wheel by the discomfort index calculated based on the bodily response.

According to some embodiments of the present disclosure, a method for controlling HVAC for automotive vehicle comprises first step of sensing bodily response of the vehicle's user by using a sensor unit installed in the vehicle, second step of controlling the temperature and humidity of the vehicle interior, and third step of controlling the second step based on the bodily response sensed by the first step and controlling the temperature, direction, volume and speed of wind blown to the vehicle interior.

The bodily response comprises at least one or more of the body temperature, respiration volume, carbon dioxide amount in the breath, voice, used words and facial expression of the user, wherein the third step includes the steps of calculating discomfort index of the user by totalizing the bodily responses and dynamically controlling the second step based on the calculated discomfort index.

In some embodiments of the present disclosure, the vehicle HVAC control method further comprises fourth step of storing as a control data the temperature, direction, volume and speed of wind to adjust the discomfort index to a predetermined level in association with the user's discomfort index, wherein when the calculated discomfort index is higher than the predetermined level, the third step further includes the step of determining the temperature, direction, volume and speed of wind blown to the vehicle interior to lower the calculated discomfort index to the predetermined level on the basis of the control data which has been stored in the fourth step.

In some embodiments of the present disclosure, the vehicle HVAC control method further comprises fifth step of receiving an input from the user, wherein when at least one of the temperature, direction, volume and speed of wind blown to the vehicle interior is changed in the fifth step, the third step further includes the step of updating the control date which has been stored in the fourth step to the changed information.

In some embodiments of the present disclosure, the vehicle HVAC control method further comprises sixth step of receiving the user's discomfort index information via communication with the user's mobile terminal, wherein the third step further includes the step of updating the control date which has been stored in the fourth step by using the user's discomfort index information received in the sixth step.

In some embodiments of the present disclosure, the vehicle HVAC control method further comprises seventh step of storing HVAC control mode in a storage unit in association with the user's discomfort index, wherein when the calculated Discomfort index is higher than the predetermined level, the third step further includes the steps of selecting a HVAC control mode corresponding to the calculated discomfort index from the HVAC control mode which has been stored in the storage unit in the seventh step, and controlling the second step in the selected HVAC control mode.

In some embodiments of the present disclosure, the third step further includes the steps of obtaining speed information of the vehicle from an electronic control unit of the vehicle, and calculating the discomfort index by combining the variation pattern of speed indicated by the obtained speed information and the bodily responses.

In some embodiments of the present disclosure, the speed variation pattern includes the variation amount of the vehicle's speed, and wherein when the variation amount of the vehicle's speed within a predetermined period of time is greater than a threshold value, the third step further includes the step of calculating the discomfort index as its value is larger in accordance with the variation amount of the speed by multiplying a coefficient according to the speed variation amount by discomfort index calculated based on the bodily response.

In some embodiments of the present disclosure, the third step further includes the steps of obtaining the operation amount of steering wheel from an electronic control unit of the vehicle, and calculating the discomfort index by combining the bodily responses and the variation pattern of the obtained operation amount of the steering wheel.

In some embodiments of the present disclosure, when the operation amount of the steering wheel within a predetermined period of time is greater than a threshold value, the third step further includes the step of calculating the discomfort index as its value is larger in accordance with the operation amount of the steering wheel by multiplying a coefficient according to the operation amount of the steering wheel by discomfort index calculated based on the bodily responses.

HVAC system with a conventional automatic temperature control function operates in a uniform manner on the basis of a preset condition for each function. In other words, if a user sets indoor temperature (for example, 23 degrees) in a state where auto button is pressed, the HVAC system operates uniformly in defined level of wind speed, air conditioner ON, wind speed in the vicinity of the face, inflow of external air or the like. However, the comfortable conditions felt by users are different according to their physical features and preferences. For example, it is different for each user to prefer the comfortable conditions such as level of wind speed, parts of the body touched by wind, circulation of indoor air, etc. Therefore, it is needed for a HVAC system to be able to consider the preferences of a driver to set wind speed, air flow, inner and outer air circulation, operating possibility of air conditioner, etc., and perform automatic function according to the setting.

Another of the technical objects of the present disclosure is to provide a device and method for calculating discomfort index based on a user's bodily response measured by using a sensor installed in an automotive vehicle, and dynamically controlling HVAC for the vehicle based on the calculated discomfort index.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An apparatus for controlling an HVAC (Heating Ventilating and Air Conditioning) device for a vehicle based on a discomfort index of a user of the vehicle, the apparatus comprising:
    a sensor unit mounted on the vehicle and configured to sense a bodily response of the user;
    an HVAC device control unit configured to control temperature and humidity inside the vehicle; and
    a control unit configured
        to control the HVAC device control unit based on the bodily response sensed by the sensor unit, and
    to control temperature, direction, air volume, and speed of wind supplied inside the vehicle, wherein
    the bodily response includes any one selected from the group consisting of body temperature, respiration volume, carbon dioxide amount in breath, voice, used words, facial expression of the user, and combinations thereof, and
    the control unit is configured
        to calculate the discomfort index of the user based on the bodily response, and
        to dynamically control the HVAC device control unit based on a calculated discomfort index.

2. The apparatus according to claim 1, further comprising a storage unit configured to store, as control data, the temperature, the direction, the air volume, and speed of the wind to adjust the discomfort index to a predetermined level in association with the discomfort index, wherein
    when the calculated discomfort index is higher than the predetermined level, the control unit is configured to determine the temperature, the direction, the air volume, and the speed of wind supplied inside the vehicle to adjust the calculated discomfort index to the predetermined level based on the control data stored in the storage unit.

3. The apparatus according to claim 2, further comprising a user operation unit configured to receive an input from the user, wherein
    when information on at least one of the temperature, the direction, the air volume, and the speed of wind supplied inside the vehicle is changed via the user operation unit, the control unit is configured to update the control date stored in the storage unit based on changed information.

4. The apparatus according to claim 2, further comprising a wireless communication unit configured to receive discomfort index information of the user via a communication with a mobile terminal, wherein
    the control unit is configured to update the control date stored in the storage unit based on the discomfort index information received by the wireless communication unit.

5. The apparatus according to claim 2, further comprising a storage unit configured to store a plurality of HVAC control modes in association with the discomfort index of the user, wherein
    when the calculated discomfort index is higher than the predetermined level, the control unit is configured
        to select a HVAC control mode corresponding to the calculated discomfort index from the plurality of HVAC control modes stored in the storage unit, and
        to control the HVAC device control unit in a selected HVAC control mode.

6. The apparatus according to of claim 1, wherein the sensor unit includes
    a facial expression recognition sensor configured to recognize a facial expression of the user, and
    a voice recognition sensor configured to recognize a voice of the user.

7. The apparatus according to claim 1, wherein the control unit is configured
    to obtain speed information of the vehicle from an electronic control unit of the vehicle, and
    to calculate the discomfort index by combining a variation pattern of speed of the vehicle indicated by the speed information and the bodily response.

8. The apparatus according to claim 7, wherein
    the speed variation pattern includes a variation amount of he speed of the vehicle, and
    when the variation amount of the speed of the vehicle within a predetermined period of time is greater than a threshold value, the control unit is configured to calculate the discomfort index in accordance with the variation amount of the speed by multiplying a coefficient according to the speed variation amount by the discomfort index calculated based on the bodily response.

9. The apparatus according to claim 1, wherein the control unit is configured
    to obtain an operation amount of steering wheel from an electronic control unit of the vehicle, and
    to calculate the discomfort index by combining the bodily response and the variation pattern of the operation amount of the steering wheel.

10. The apparatus according to claim 9, wherein when the operation amount of the steering wheel within a predetermined period of time is greater than a threshold value, the control unit is configured to calculate the discomfort index in accordance with the operation amount of the steering wheel by multiplying a coefficient according to the operation amount of the steering wheel by the discomfort index calculated based on the bodily response.

* * * * *